United States Patent
Glabe

[15] 3,663,232
[45] May 16, 1972

[54] MACARONI PRODUCT CONTAINING NONFAT MILK SOLIDS

[72] Inventor: Elmer F. Glabe, Chicago, Ill.

[73] Assignee: Milk Research, Inc., Fond du Lac, Wis.

[22] Filed: Jan. 2, 1968

[21] Appl. No.: 694,795

Related U.S. Application Data

[63] Continuation-in-part of Ser. No. 432,815, Feb. 15, 1965, abandoned.

[52] U.S. Cl. ..................................................99/85
[51] Int. Cl. ...............................................A23l 1/16
[58] Field of Search......................................99/85

[56] References Cited

UNITED STATES PATENTS

| | | | |
|---|---|---|---|
| 1,220,205 | 3/1917 | Desmarais | 99/85 |
| 1,349,524 | 8/1920 | Miner | 99/85 |

FOREIGN PATENTS OR APPLICATIONS

| | | | |
|---|---|---|---|
| 550,789 | 12/1957 | Canada | 99/85 |
| 550,797 | 12/1957 | Canada | 99/85 |

OTHER PUBLICATIONS

Earle et al., Industrial and Engineering Chemistry, Vol. 33, No. 3 pages 642– 647 article entitled " Drying Macaroni"

*Primary Examiner*—Raymond N. Jones
*Attorney*—Johnston, Root, O'Keeffe, Keil, Thompson & Shurtleff

[57] ABSTRACT

A macaroni product containing less than 0.5 percent by weight fat and 5 percent to 30 percent by weight nonfat milk solids is prepared. In the process nonfat dry milk is used and the preliminary partial drying is effected at a relative humidity of 55 percent to 70 percent and a temperature of 95° F. to 105° F.

1 Claim, No Drawings

MACARONI PRODUCT CONTAINING NONFAT MILK SOLIDS

This application is a continuation-in-part of my U.S. application Ser. No. 432,815 filed Feb. 15, 1965 now abandoned.

This invention relates to a new and improved product which is herein referred to as a nonfat milk macaroni product.

The name "macaroni product" has a well defined meaning as defined in the definitions and standards of identity for macaroni and noodle products promulgated under the United States Federal Food, Drug and Cosmetic Act and published in Part 16, Chapter I, Title 21 of the Code of Federal Regulations (see the Federal Register Oct. 13, 1964).

Macaroni products are the class of food each of which is prepared by drying formed units of dough made from semolina, durum flour, farina, flour or any combination of two or more of these with water and with or without one or more optional ingredients. Macaroni is the macaroni product the units of which are tube-shaped and more than 0.11 inch and less than 0.27 inch in diameter. Spaghetti is the macaroni product the units of which are tube-shaped or cord-shaped (not tubular) and more than 0.06 inch but not more than 0.11 inch in diameter. Vermicelli is the macaroni product the units of which are cord-shaped (not tubular) and not more than 0.06 inch in diameter.

Milk macaroni products as defined in the aforesaid definitions and standards of identity contain not less than 3.8 percent milk solids by weight of the finished milk macaroni product. The milk ingredients must be concentrated milk, evaporated milk, dried milk, or a mixture of butter with skim milk, concentrated skim milk, evaporated skim milk, nonfat dry milk (dried skim milk), or any two or more of these, in such proportions that the weight of nonfat milk solids in such mixture is not more than 2.275 times the weight of milk fat therein. This requires the use of at least 1.67 percent by weight milk fat to meet the standard of identity.

The process for making macaroni products is the same regardless of the eventual shape of the finished piece. This is determined by the type of die through which the dough is extruded. The original process for making macaroni as used by all of the manufacturers in the industry consists of feeding durum semolina and/or flours into a standard macaroni mixer. This is a "continuous" type mixer. Water is metered into the same end of the mixer at which the flour is admitted. The amount of water added falls within a relatively narrow range. The amount is generally between 30 percent to 35 percent based on the weight of semolina. The mixer combines the water and semolina into a loose dough. The characteristic of this dough is very dry and crumbly. It is completely dissimilar from a bread dough because if durum semolina is used exclusively, the dough retains a short characteristic rather than a stretchable characteristic which is typical of bread dough made from ordinary hard wheat flour. If ordinary hard wheat flour is employed in making macaroni the formation of a "stretchable" dough must be avoided since formation of this type would give extreme difficulty in the later stages of the manufacturing process, particularly in the extrusion stage.

The loose dough described above is conducted to an adjacent, but frequently contiguous piece of machinery known as the press. In this area, and in some mixers throughout all but the first stages of the mixing, the dough is mechanically manipulated under a vacuum of 21 inches to 27 inches of mercury. The vacuum-mixing in this chamber serves to draw out all collections of air or other gases which might be mechanically entrapped in the dough. These small bubbles give rise to macaroni products with uneven surfaces and can cause some cracking or breaking of the finished dried product. Another reason for the vacuum-mixing is to prevent the oxidase enzymes in the flour (durum or ordinary hard wheat) from oxidizing the natural carotin, or yellow pigment of the wheat, into a colorless substance. The process is upset if the enzyme has no oxygen with which to complete the reaction. The macaroni industry strives to make product with as much natural yellow color as is possible. White macaroni products are less desirable than those having a yellow or creamy color after having been prepared for table use.

The dough as it leaves the vacuum area is forced by mechanical means through a die which determines the shape of the end product. There are many well known shapes, all of which are brought about by the particular construction of the aperture in the die. Changes in shapes are brought about by locating retarding points in the apertures which cause the extruding dough to turn and assume the shape of an elbow macaroni, or to assume the shape of sea-shells as in "shell macaroni" and others.

Upon coming from the die the product is cut by means of automatically operating knife blades. In the case of "spaghetti" the dough is extruded as long thin rods, approximately 50 inches to 60 inches in length. These rods are then folded in half and automatically hung over rods or "sticks." Each rod of spaghetti dough lies adjacent to other rods and must not lie on top of another rod.

In the case of "short goods" which is macaroni, elbow macaroni, shell macaroni, and other short pieces, the cutting mechanism cuts the dough by means of travelling across the surface of the die. The speed of the blade determines the length of the piece.

Commonly these pieces are then dropped into an air conveying system which conducts the pieces to a hopper. From here the pieces are spread by a mechanical spreader on trays or on continuous belts, both of which then go into the drying chambers. In the case of short goods, the depth of the macaroni pieces is sometimes several inches. During the drying operation these beds are agitated or completely turned over to permit uniform drying.

In the case of spaghetti or "long goods" the product suspended on the rods or sticks, is mechanically conveyed to the drying chambers.

The drying of macaroni products requires considerable technical skill and knowledge of both the mechanical operation of the drying chambers as well as a knowledge of the transfer of water from the dough to the atmosphere, and a knowledge of the chemistry involving the proteins and the starch of the particular wheat endosperm materials which were used in making the macaroni products. The way that the macaroni products are dried will determine to a large extent the quality of the finished dried product. Even if the highest quality durum semolina is used and the dough is properly formed, if the drying operation is improperly carried out, the resulting macaroni products may be "checked." This is the industry term supplied to products which display tiny cracks in the dried macaroni. These cracks are visible to the naked eye on careful inspection and are very easily visible with the use of a low power microscope. "Checked" macaroni products generally do not display the characteristic cracks until the dried product is several days old. From this point on the cracks become more visible as the product is held under storage. The cracking develops even though further evaporation of moisture from the dried product is prevented by enclosing the macaroni products in moisture-proof packing materials or even closed metal containers. The development of these cracks or checks is a chemical process related to moisture transfer from starch to protein or the reverse. The exact details of the chemical reactions in checking are not thoroughly understood or completely explored. The industry does know how to prevent checking in most cases of drying macaroni products. However, checking still occurs in a relatively large number of cases in day to day production, resulting in the manufacturer having to bring back product which is out on the grocers' shelves. Checked macaroni products break into small pieces when cooked.

At the present time, the drying of macaroni products requires approximately 24 to 36 hours or even longer. Efforts are now being made to reduce the drying time.

There are three distinct stages in the drying of macaroni products. The first stage is known as the "Preliminary Drying." In this step drying is carried out at approximately 85° F. dry bulb and approximately 80° F. wet bulb. The macaroni products are kept under these conditions for about 30 minutes. During this stage the surface moisture is removed rather rapidly. Normally this makes for a condition of water transfer from the interior of the macaroni piece to the outer surface. If the macaroni is allowed to remain under the conditions in the preliminary drier too long, the outer surface will become drier than the interior of the macaroni piece. The water in the interior, attempting to find its way out, will cause the characteristic cracks or fissures attendant to checking.

In order to prevent this the macaroni products are removed from the preliminary drier and go into a "sweating period." In this section of the drying operation a typical condition will be 83° F. wet bulb. These conditions allow transfer of the interior moisture to the surface to get well under way without the development of a dried outer surface. The macaroni products commonly remain under these conditions for about one hour.

A final or finish drying is carried out in the third stage. At the time the macaroni products enter the drier, the dry bulb will be 95° F. and the wet bulb about 91° F. During the subsequent hours in the drier the conditions are gradually changed by raising the dry bulb temperature, in a typical instance, to 102° F. and reducing and holding the wet bulb readings to 90° F. The macaroni products are in this drier for another 26 to 40 hours.

Upon coming from the driers the finished product in the case of spaghetti, is cut to the desired lengths. These lengths are then weighed and packaged as commercial spaghetti.

Short goods types of macaroni products are weighed and packaged. Types of packaging materials used are those which prevent moisture change in the finished product.

The moisture content of the finished product is in the neighborhood of 12 percent. Different cuts of macaroni products will have different equilibrium-moisture values. The method of handling the product during mixing and drying, and the type of raw materials used, will also influence the equilibrium-moisture values.

The character of macaroni products is not resident in any one particular characteristic. Instead, it is a combination of a number of characteristics, all of which blend into making the product superior, mediocre, or poor in the mind of the person eating the product. Typical chemical analyses are, therefore, of little value. The amount of water which the macaroni absorbs during the cooking operation is of some value as a measure of its quality, however, a full evaluation of the quality of macaroni products can only be made by taking all factors into consideration.

It was for this purpose that the Cooking Test Profile Method was developed some years ago. It has been found to be eminently successful in evaluating macaroni products. Although it is a subjective test, a trained panel has no difficulty in producing the same results on the same products when they are examined under numbers, the code of which is unknown to the judges. The method of making the Cooking Test Profile is as follows:

All samples to be tested are given code numbers.

A 50 gram sample of the macaroni to be tested is used for the Cooking Test Profile. If spaghetti is to be tested, the strands are first cut into uniform 4 inch lengths.

One liter of distilled water (no salt added) is brought to a boil. The macaroni is added. "Cooking time" is started when the water returns to a boil. The heat is adjusted to obtain a slow, rolling boil. The macaroni is stirred occasionally to prevent sticking.

After boiling 10-12 minutes, the macaroni is tested for "doneness." This is determined by either chewing in the mouth, or in the case of spaghetti, by the glass plate method. This method consists of pressing a strand of spaghetti between two glass plates and observing for the presence of an uncooked core. Strands of spaghetti are removed from the cooking water periodically and tested by this glass plate method until the uncooked core just disappears. The elapsed time between the time the water returned to boil after adding the spaghetti, to the time the uncooked core just disappears is the "cooking Time" of the spaghetti. This is designated as time "T."

One minute after the cooking time (T+1), samples of the cooked macaroni are removed with a fork and given on white plates to an experienced panel of judges for evaluation.

The macaroni in the pan is allowed to continue boiling and after an additional 5 minutes (T+6), another set of samples is removed for the judges' evaluation.

Cooking of the macaroni is continued for another 5 minutes (T+11), after which the final set of cooked macaroni samples is removed for evaluation by the judges.

The panel of judges evaluates each sample of macaroni (spaghetti) for each of the characteristics shown on the Cooking Test Profile Report at each Cooking Time period (T+1, T+5, T+11). Demerits are assigned for each characteristic showing "less than standard" in the expert opinion of the panel judge. Each judge thereby evaluates each sample of macaroni (spaghetti) for each characteristic at three different cooking periods.

The scores arrived at by all the judges on the panel are "averaged" at the end of the test series. These values are set down on the report. The total demerits are subtracted from 100 (perfect score) to give a "total score value" at each cooking period (T+1, T+5, etc.) for quick comparison. This is the "Cooking Profile" of the sample.

A change in value of two or more points in each characteristic and in total score is a significant change.

Macaroni products which show the least change in any and all characteristics throughout these three tests at the three cooking times have the highest quality.

At the end of the cooking period, the cooking water is observed for cloudiness and leaching out of the color from the macaroni. Periodically during cooking, the odor of the cooking water is noted. This is of particular importance for noodles where poor grade eggs can produce off-odors. Usually 2, 3 or 4 Profile Tests are made simultaneously in order to obtain a direct comparison between different macaroni samples.

Although provision has been made in the Federal Standards for milk macaroni no product of this kind exists on the commercial United States market today.

One difficulty attendant to the manufacture of milk macaroni is that introduction of even the required very small amount of fat (in this instance butterfat) causes the macaroni dough to become very flaccid and soft. It assumes the characteristics of a viscous liquid rather than a flowable solid. The dough containing butterfat or any fat, flows easily. If this dough is extruded as spaghetti, the long rods of dough upon being suspended from the usual drier-rods or sticks, continue to flow or in the terminology of the industry, they sag. The result of this is spaghetti rods which are very uneven in appearance being thinner in some places than in others; this in turn makes for uneven cooking and further accentuates the softening of the product during the cooking step for preparation of the product for table use. In short, the presence of the required amount of butterfat or fat of any kind, results in a product which is unsaleable. The quantity of fat which produces this sagging character is relatively small. Since the Federal Standard of Identity for milk macaroni requires the presence of butterfat in relation to the quantity of nonfat milk solids used, the amount of fat becomes substantial and produces the difficulties indicated.

Another difficulty is that the butterfat in the finished milk macaroni becomes rancid giving the finished product a very disagreeable taste and making it unsaleable. The rancidity of the butterfat is very likely brought about by the long drying period (40 hours) at relatively high temperatures for butterfat stability (100° F.).

In accordance with this invention it has been found that macaroni products containing 5 percent to 25 percent by weight nonfat milk solids can be prepared with excellent texture and eating qualities provided the amount of fat is zero or is kept at a minimum below that presently specified in the standards of identity previously described in any case below 0.5 percent by weight fat.

The invention was evaluated by comparative tests of standard spaghetti versus spaghetti made with different percentages of dry milk containing fat versus spaghetti made with different percentages of nonfat dry milk without any butterfat added. The invention was also evaluated by comparative tests of standard macaroni versus macaroni made with different percentages of nonfat milk without any butterfat added.

In the spaghetti tests the condition of the spaghetti after extruding and after drying was observed. Slackness after extruding is very undesirable because it gives a non-uniform product. The macaroni was also examined and compared in the dry state. A highly checked product will tend to be mushy on cooking. Cooking test profiles were made on all products.

The experiments which were made to demonstrate the basic features of the invention of nonfat milk macaroni were on both a pilot macaroni plant and on commercial macaroni plant equipment. The pilot plant experiments were made on six to eight pound batches. The equipment consisted of a small mixer equipped with vacuum. The press and die were of smaller size, but commercially similar design.

The commercial plant experiments were made with typical industry equipment and were made using 1500 pound batches of product. Both elbow macaroni and standard size spaghetti extrusions were made. All of the products were evaluated according to the Cooking Test Profile and a dry product evaluation.

All of the data in these experiments were assembled into tables. On these tables the Cooking Test Profile data have been condensed to indicate the two major characteristics of the macaroni products, taste and texture. Similarly, the dry product evaluation has been condensed to the surface appearance color and whether the product is checked or not.

In making the Cooking Test Profile evaluations, the spaghetti and macaroni products were tested five days after they came from the drier. It has been found that there is a gradual change in the product from the time it is taken from the drier through the next 48 hours. By 5 days, the product is then stable and can then be evaluated.

The same is relatively true of the dry product evaluation. Checking is not always evident in the first day or two. Sometimes it does not show up for several weeks. Therefore, an evaluation was made immediately after coming from the drier (one day) and again 2 weeks thereafter.

In the experiments shown in the tables the proportions are by weight unless otherwise indicated.

TABLE I.—SPAGHETTI EXPERIMENTS

| Experiment | 1 | 2 | 3 | 4 |
|---|---|---|---|---|
| Semolina | 100% | 97.12% | 92.81% | 95.00% |
| Full fat dry milk added | | 2.88 | 7.19 | |
| Butter fat present | | (0.88) | (2.19) | |
| Nonfat dry milk added | | | | 5.00 |
| Nonfat milk solids present | | (2.00) | (5.00) | (5.00) |
| Dough, water added [1] | 28.00 | 28.00 | 28.00 | 28.00 |
| Condition of spaghetti after extruding | Firm, Normal | Slack, stretches | Very slack, sags from drier rod. | Slightly soft but does not sag. |
| Condition of dry spaghetti 1 day after finish drying.[2] | Normal | Uneven surface | Uneven surface | Uneven surface, white crust. |
| Condition of dry spaghetti 2 weeks after drying.[2] | do | do | Uneven surface, checked. | Uneven surface, white crust, checked. |
| Condition of cooked spaghetti 5 days after drying.[3] | Normal texture, normal taste. | Soft texture, soft taste. | Very soft texture, very poor taste (rancid). | Texture slightly firmer than #1, taste slightly better than #1. |

[1] Quantity of water expressed as pounds per 100 lbs. of semolina or semolina and dry milk.
[2] Preliminary drier: 95° F. dry bulb; 90° F. wet bulb; 83% R.H.; 0.5 hr. Sweat period: 95° F. dry bulb; 93° F. wet bulb; 92% R.H.; 1.0 hr. Finish drier: 95–102° F. dry bulb; 91–90° F. wet bulb; 85–64% R. H.; 40 hours.
[3] Summary of salient differences determined by Cooking Test Profile.

TABLE II.—SPAGHETTI EXPERIMENTS

| Experiment | 5 | 6 | 7 | 8 |
|---|---|---|---|---|
| Semolina | 100% | 97.12% | 92.81% | 95.00% |
| Full Fat dry milk added | | 2.88 | 7.19 | |
| Butter fat present | | (0.88) | (2.19) | |
| Nonfat dry milk added | | | | 5.00 |
| Nonfat dry milk solids present | | (2.00) | (5.00) | 5.00 |
| Dough, water added [1] | 26.00 | 26.00 | 26.00 | 26.00 |
| Condition of spaghetti after extruding | Very firm, stiff | Slack, stretches | Very slack, sags from drier rods. | Firm, normal. |
| Condition of dry spaghetti 1 day after finish drying.[2] | Slightly uneven, brittle. | Uneven surface | Uneven surface | Uneven surface, white crust. |
| Condition of dry spaghetti 2 weeks after finish drying.[2] | Normal | Uneven surface slight checking. | Uneven surface, checked. | Uneven surface, checked. |
| Condition of cooked spaghetti 5 days after drying.[3] | Normal texture, normal taste. | Soft texture, poor taste. | Very soft texture, very poor taste (rancid). | Texture slightly firmer than No. 5, taste slightly better than No. 5. |

See footnotes at end of Table I.

TABLE III.—SPAGHETTI EXPERIMENTS
[Levels of nonfat dry milk as related to drying conditions]

| Experiment | 9 | 10 | 11 | 12 |
|---|---|---|---|---|
| Semolina | 95.0% | 92.5% | 90.0% | 85.0% |
| Nonfat dry | 5.0 | 7.5 | 10.0 | 15.0 |
| Dough, water added [1] | 28.0 | 26.0 | 26.0 | 26.0 |
| Condition of spaghetti after extruding. | Firm, normal | Firm, normal | Slack, sags | Very slack, sags. |
| Condition of dry spaghetti 1 dry after finish drying.[2] | Uneven surface, white crust. | Uneven surface, white crust. | Uneven surface, white crust. | Uneven surface, white crust. |
| Dry spaghetti after 2 weeks [2] | Uneven surface, not checked. | Uneven surface, not checked. | Uneven surface, white crust, not checked, slightly brittle. | Uneven surface, white crust, checked, brittle. |
| Condition of cooked spaghetti 5 days after drying.[3] | Texture slightly firmer than #5, taste slightly better than #5. | Firmer than #9, better than #9. | Equal to #9, better than #10. | Softer than #9, equal to #5, better than #11. |

See footnotes at end of Table I.

TABLE IV (a)

The dry product evaluation of Example 1, Table I (standard macaroni) was as follows:

| Serious Flaws | Range of Demerits | Demerits |
|---|---|---|
| Checked | 0–20 | 0 |
| Split | 0–10 | 0 |
| Deformed | 0–10 | 0 |
| Color | | |
| Gray or Brown (10 = Very Dark) | 0–10 | 0 |
| Yellow (5 = No Yellow) | 0–5 | 2 |
| Appearance | | |
| Large bubbles (poor Predrying) | 0–5 | 0 |
| Small bubbles (poor vacuum) | 0–5 | 0 |
| White specks | 0–5 | 1 |
| Dark Specks | 0–5 | 1 |
| Rings | 0–5 | 0 |
| Streaks | 0–10 | 0 |
| Roughness | 0–10 | 0 |
| Total Demerits | (0–100) | 4 |
| Score (100 - Demerits) | | 96 |

TABLE IV (b)

The product evaluation of Example 1, Table I (standard macaroni) after cooking times of 10 minutes, 15 minutes and 20 minutes was as follows:

| | Range of Demerits | Cooking Time—Minutes 10 | 15 | 20 |
|---|---|---|---|---|
| Gray or Brown Color (5 = very dark) | 0–5 | 0 | 0 | 0 |
| Yellow Color (5 = no yellow) | 0–5 | 2 | 2 | 3 |
| Surface irregularity | 0–5 | 0 | 0 | 1 |
| Splitting or breaking | 0–10 | 0 | 0 | 1 |
| Stickiness | 0–10 | 1 | 2 | 2 |
| Slime | 0–10 | 2 | 4 | 5 |
| Odor | 0–10 | 1 | 1 | 1 |
| Taste | 0–10 | 1 | 3 | 3 |
| Too soft | 0–10 | 2 | 4 | 5 |
| Too firm | 0–5 | 0 | 0 | 0 |
| Sticks to Teeth | 0–10 | 0 | 1 | 1 |
| Doughiness or Lack of Elasticity | 0–10 | 1 | 2 | 4 |
| Total Demerits | 0–100 | 10 | 19 | 26 |
| Score (100 - Demerits | | 90 | 81 | 74 |

The appearance of the cooking water after 20 minutes of cooking was moderately cloudy and had a moderately yellow color. The odor of the cooking water was normal.

TABLE V (a)

The dry product evaluation of Example 11, Table III, (nonfat milk-macaroni—10% nonfat milk solids) was as follows:

| | Range of Demerits | Demerits |
|---|---|---|
| Serious Flaws | | |
| Checked | 0–20 | 0 |
| Split | 0–10 | 0 |
| Deformed | 0–10 | 0 |
| Color | | |
| Gray or Brown (10 = Very Dark) | 0–10 | 0 |
| Yellow (5= No yellow) | 0–5 | 2 |
| Appearance | | |
| Large bubbles (poor predrying) | 0–5 | 0 |
| Small bubbles (poor vacuum) | 0–5 | 0 |
| White specks | 0–5 | 4 |
| Dark Specks | 0–5 | 1 |
| Rings | 0–5 | 0 |
| Streaks | 0–10 | 0 |
| Roughness | 0–10 | 3 |
| Total Demerits | 0–100 | 10 |
| Score (100 - Demerits | | 90 |

TABLE V (b)

The product evaluation of Example 11, Table III, (nonfat milk-macaroni—10% nonfat milk solids) after cooking times of 10 minutes, 15 minutes and 20 minutes was as follows:

| | Range of Demerits | Cooking Time—Minutes 10 | 15 | 20 |
|---|---|---|---|---|
| Gray or Brown Color (5 = very dark) | 0–5 | 0 | 0 | 0 |
| Yellow Color (5 = no yellow) | 0–5 | 1 | 1 | 2 |
| Surface irregularity | 0–5 | 2 | 2 | 3 |
| Splitting or breaking | 0–10 | 0 | 0 | 1 |
| Stickiness | 0–10 | 0 | 0 | 0 |
| Slime | 0–10 | 2 | 3 | 4 |
| Odor | 0–10 | 0 | 0 | 0 |
| Taste | 0–10 | 0 | 0 | 0 |
| Too soft | 0–10 | 2 | 3 | 6 |
| Too firm | 0–5 | 0 | 0 | 0 |
| Sticks to teeth | 0–10 | 0 | 1 | 1 |
| Doughiness or lack of Elasticity | 0–10 | 2 | 2 | 3 |
| Total Demerits | 0–100 | 9 | 12 | 20 |
| Score (100 - Demerits) | | 91 | 88 | 80 |

The appearance of the cooking water after 20 minutes of cooking was extremely cloudy and had a moderately yellow color. The odor of the cooking water was normal.

TABLE VI (a)

The dry product evaluation of Example 12, Table III, (nonfat milk-macaroni—15% nonfat milk solids) was as follows:

| | Range of Demerits | Demerits |
|---|---|---|
| Serious Flaws | | |
| Checked | 0–20 | 3 |
| Split | 0–10 | 0 |
| Deformed | 0–10 | 1 |
| Color | | |
| Gray or Brown (10 = Very Dark) | 0–10 | 0 |
| Yellow (5 = No Yellow) | 0–5 | 0 |
| Appearance | | |
| Large bubbles (poor predrying) | 0–5 | 1 |
| Small bubbles (poor vacuum) | 0–5 | 0 |
| White Specks | 0–5 | 5 |
| Dark Specks | 0–5 | 0 |
| Rings | 0–5 | 0 |
| Streaks | 0–10 | 0 |
| Roughness | 0–10 | 4 |
| Total Demerits | 0–100 | 14 |
| Score (100 - Demerits) | | 86 |

TABLE VI (b)

The product evaluation of Example 12, Table III, (nonfat milk-macaroni—15% nonfat milk solids) after cooking times of ten minutes, fifteen minutes and twenty minutes was as follows:

| | Range of Demerits | Cooking Time—Minutes 10 | 15 | 20 |
|---|---|---|---|---|
| Gray or Brown Color (5 = very dark) | 0–5 | 0 | 0 | 0 |
| Yellow color (5 = no yellow) | 0–5 | 1 | 1 | 2 |
| Surface irregularity | 0–5 | 2 | 3 | 3 |
| Splitting or breaking | 0–10 | 1 | 1 | 2 |
| Stickiness | 0–10 | 0 | 0 | 0 |
| Slime | 0–10 | 2 | 3 | 4 |
| Odor | 0–10 | 0 | 0 | 0 |
| Taste | 0–10 | 0 | 0 | 0 |
| Too soft | 0–10 | 3 | 5 | 6 |
| Too firm | 0–5 | 0 | 0 | 0 |
| Sticks to teeth | 0–10 | 0 | 1 | 1 |
| Doughiness of lack of elasticity | 0–10 | 2 | 2 | 5 |
| Total Demerits | 0–100 | 11 | 16 | 23 |
| Score (100 - Demerits) | | 89 | 84 | 77 |

The appearance of the cooking water after 20 minutes of cooking was extremely cloudy and had a moderately yellow color. The odor of the cooking water was normal.

TABLE VII

Elbow Macaroni Experiments

| Experiment | 13 | 14 | 15 |
|---|---|---|---|
| Semolina | 100.0% | 85.0% | 75.0% |
| Nonfat Dry Milk | — | 15.0 | 25.0 |
| (1)Dough, Water Added | 25.8 | 25.1 | 21.2 |
| Condition of Macaroni at Extrusion | normal firm | normal firm | normal firm |
| Condition of dry Macaroni 12 days after drying (2) | normal | slightly brittle | slightly brittle white surface |
| (3)Condition of cooked Macaroni | normal texture normal taste | soft texture better taste than No. 13 | very soft texture taste equal to No. 14 |
| ((4)Average Cooking Test Profile Score | 88.6 | 83.3 | 83.1 |

(1) Quantity of water expressed as pounds per 100 lbs. semolina or semolina and dry milk
(2) Preliminary Drier 9°F. Dry bulb 93°F. Wet Bulb 67 % R.H. 25 mins. Sweat Period 95°F. Dry bulb 93°F. Wet Bulb 92% R.H. 1 hr. Finish Drier 95–102°F. Dry Bulb, 91–90°F. Wet Bulb, 85%–64% R.H. for 18 hours
(3) Summary of Taste and Texture Characteristics taken from composite Cooking Test Profile Scores. (Texture Firmness Rating made at 11' cooking time period.)
(4) Average of Cooking Test Profile Score Totals (from Table VIII).

In the experiments set forth in Table VII, the semolina used was from a different crop from that used in Experiment 1 of Table I and hence there are some slight differences in the product but these are insignificant.

All of the cooking test profiles were made by a panel of not less than three people. The scores of all panel members were then combined into one average Cooking Test Profile score. Table VIII gives the Cooking Test Profile Score for each cooking period, 11, 16 and 21 minutes, averaged for the panel members. In each test the total scores for each cooking test period were then compiled into a second average shown in Table VIII in the far right-hand corner.

TABLE VIII

Elbow Macaroni Experiments

| Experiment | Semolina | Nonfat Milk | Cooking Test Profile Score (Min.) | | | Average |
|---|---|---|---|---|---|---|
| | | | 11 | 16 | 21 | |
| 13 | 100.0% | — | 90.0 | 89.5 | 86.5 | 88.6 |
| 14 | 85.0 | 15% | 89.0 | 84.0 | 77.0 | 83.3 |
| 15 | 75.0 | 25 | 88.5 | 84.5 | 76.5 | 83.1 |

TABLE IX

Nutritional Factors of Macaroni Made with Nonfat Milk (15%)

| | 100% Semolina Macaroni No. 13 | Macaroni with 15.0% Nonfat Dry Milk No. 14 |
|---|---|---|
| Moisture | 10.0% | 3.0% |
| Calories | 366 | 363 |
| Protein | 12.6% | 35.9% |
| Fat | 1.2% | 0.8% |
| Carbohydrate | 75.5% | 52.3% |
| Ash | 0.7% | 8.0% |
| Calcium | 27 mg/100g | 1308 mg/100g |
| Phosphorus | 162 mg | 1016 mg |
| Iron | 1.3 mg. | 0.6 mg |
| Sodium | 2 mg | 532 mg |
| Potassium | 197 mg | 1745 mg |

Amino Acids

| | 100% Semolina Macaroni No. 13 | Macaroni with 15.0% Nonfat Dry Milk No. 14 |
|---|---|---|
| Cystine | 0.2% | 0.3% |
| Isoleucine | 0.6 | 2.5 |
| Leucine | 1.0 | 4.5 |
| Lysine | 0.5 | 2.7 |
| Methionine | 0.2 | 1.0 |
| Phenylalanine | 0.7 | 2.0 |
| Threonine | 0.4 | 1.7 |
| Tryptophane | 0.2 | 0.5 |
| Valine | 0.6 | 2.6 |

Experiments 2 and 3 in Table I show the results of attempting to make "Milk Macaroni" with butterfat present in amounts exceeding 0.5 percent by weight. It will be noted that the dough after being extruded into spaghetti, showed extreme tendencies to stretch even when as little as 2.88 percent of full fat dry milk was used. Even more significant, however, is the effect on flavor. The rancidity character makes the product not only unsaleable, but inedible. Experiments 6 and 7 in Table II demonstrate what happens if the dough water is reduced from the normal 28 percent to 26 percent with the objective of attempting to reduce the slackness of the dough. This has virtually no significant effect and the resulting product is still rancid in taste.

Experiments 4 and 8 show that 5 percent of nonfat milk causes the finished product to check after about two weeks time. The taste of the nonfat milk-macaroni product, however, is very good in contrast to the "Milk Macaroni." This demonstrates that the butterfat is responsible for the poor taste.

The data shown in Table III, Experiments 9 to 12, demonstrates an important part of the invention. This data shows that higher quantities of nonfat milk solids can be used in making nonfat milk-macaroni products if the knowledge shown in this table is applied. The essence of this knowledge is that the spaghetti must be subjected to a much lower relative humidity, not exceeding 70 percent, preferably 55–70 percent, relative humidity at dry bulb temperatures of 95°–105° F., in the preliminary drier than standard spaghetti. The effect of this is to draw more moisture from the product during this stage than is normally done. This prevents or retards the nonfat milk solids from migrating to the surface which it will do if the evaporation of moisture from the product during the preliminary drier stage is too slow.

This step in turn is preferably accompanied by a relatively long finish drying period. If this relationship between preliminary and finish drying is carefully observed, it is possible to use as much as 10 percent nonfat milk solids without having the product check. At the 10 percent level and higher the white crust which the spaghetti products in particular show, is evidence of the migration of the nonfat dry milk to the surface. This makes for a product with a rough surface and brittle in character in the dry form. However, the taste of the cooked product is still excellent.

Taking all of the results shown in Tables I to IX together, it is quite evident that by the practice of this invention it is possible to make a new and improved product herein referred to as "nonfat milk macaroni" with as much as 10 percent of nonfat milk solids and even up to 25 percent. As the quantity of nonfat milk solids is increased from 10 percent to 25 percent by weight, some of the most desirable physical properties are not attained but the product is still very palatable. In general, the range of nonfat milk solids is from 5 percent to 25 percent, preferably 10 percent to 15 percent, and correspondingly the amounts of semolina, durum flour, or any wheat flour is 95 percent to 75 percent, preferably 90 percent to 85 percent by weight. Products within this range have a good taste, acceptable texture, and in general are better than standard macaroni. In contrast, products heretofore described as "Milk Macaroni" which contain butterfat in excess of 0.5 percent by weight are unsaleable and virtually inedible.

Standard macaroni products have virtually the same proximate analysis as the wheat endosperm materials from which they have been made. All the wheat endosperm products, whether durum or regular wheat, have a fair amount of protein. However, this protein is not a "complete" protein in the view of the nutritionists. Wheat protein lacks one of the amino acids essential to human nutrition. Lysine content is very low. Therefore, all wheat products unless they have been fortified with other proteins, are not considered to be food products on which man or animal could subsist indefinitely without impairment of the body tissues. It is for this reason that white bread has for many years been made with milk either in liquid form or as dehydrated milk. The result of this is that milk protein which is rich in lysine supplements wheat protein, thereby making it a balanced or complete protein. Experiments have shown beyond any question of doubt that white bread made with nonfat dry milk will support animal metabolism without any impairment of tissue if this bread is the only item of protein in the diet.

The present invention makes it possible to produce macaroni products of much higher nutritional value than standard macaroni products. They have nonfat milk solids intimately associated with wheat solids. Standard macaroni products are usually made with 100 percent semolina which has an average protein content of 12.5 percent by weight, calculated on a 14 percent moisture basis. Nonfat milk macaroni products of the present invention made with 10 percent nonfat milk solids contain a total of 14.75 percent protein. Thus, there is an 18 percent increase in the total protein content of nonfat milk macaroni containing 10 percent by weight nonfat milk solids as compared with standard macaroni. Wheat flour contains 0.274 percent lysine. A nonfat dry milk macaroni containing 10 percent by weight nonfat milk solids contains 0.45 percent lysine or a 64 percent increase in lysine. Where the macaroni contains 15 percent nonfat milk solids, the protein content and other factors are increased to a greater extent as shown in Table IX. The lysine content is increased more than five times.

While the invention has been specifically described with respect to the preparation of nonfat milk macaroni and nonfat milk spaghetti, it will be understood that the invention is generally applicable to the preparation of nonfat milk vermicelli and other nonfat milk macaroni products which are made from nonfat milk solids, water and flours of the type ordinarily used in making macaroni products, such as semolina, durum flour, farina and mixtures thereof, with or without optional ingredients as specified in the definitions and standards of identity for macaroni products heretofore promulgated under the United States Federal Food, Drug and Cosmetic Act, subject to the proviso, however, that the fat content is preferably zero and in any case does not exceed 0.5 percent by weight of the nonfat milk macaroni product.

The products of the invention can also be packaged in closed containers, with or without liquid or solid flavoring ingredients. Thus, spaghetti made with nonfat milk solids in accordance with the invention can be canned with tomato sauce and/or other ingredients.

I claim:

1. A process of making nonfat milk macaroni products which comprises making a dough from nonfat dry milk, water, and a flour from the class consisting of semolina, durum flour, farina and mixtures thereof, while maintaining a butterfat content less than 0.5 percent by weight of the total solids, the proportions of nonfat dry milk solids being within the range of 5 percent to 25 percent by weight of the total solids, forming said dough into predetermined shapes, subjecting the shaped nonfat milk macaroni product to preliminary partial drying at a relative humidity of 55 percent to 70 percent at 95°–105° F. for approximately 30 minutes, allowing the partially dried product to sweat, and thereafter drying the product for a longer period and at a higher relative humidity than employed in the preliminary drying.

* * * * *